July 8, 1924.

A. J. OTTO ET AL 1,500,260

THERMOSTAT

Filed Oct. 31, 1923

Inventor
Arthur J. Otto
Carl A. Otto
By Dodge and Sons
Attorneys

Patented July 8, 1924.

1,500,260

UNITED STATES PATENT OFFICE.

ARTHUR J. OTTO AND CARL A. OTTO, OF MILWAUKEE, WISCONSIN, ASSIGNORS TO JOHNSON SERVICE COMPANY, OF MILWAUKEE, WISCONSIN, A CORPORATION OF WISCONSIN.

THERMOSTAT.

Application filed October 31, 1923. Serial No. 671,936.

*To all whom it may concern:*

Be it known that we, ARTHUR J. OTTO and CARL A. OTTO, citizens of the United States, residing at Milwaukee, in the county of Milwaukee and State of Wisconsin, have invented certain new and useful Improvements in Thermostats, of which the following is a specification.

The present invention relates to automatic control of atmospheric conditions such as temperature humidity and the like, and resides in certain structural improvements in automatic control devices of the pressure operated relay type.

The object of the invention is to produce a device in which the controlled pressure equals or approximates the pressure acting in the relay motor. In most prior devices the controlled pressure has generally been less than the relay motor pressure by an amount dependent upon the strength of the valve spring or springs. This difficulty can be overcome by the use of a differential diaphragm structure, but such prior structures, so far as we are aware, have been complicated, have commonly required the use of leather or fabric diaphragm, and have been difficult to dismount for cleaning or repair. The present invention provides a device of this character having a differential diaphragm control and capable of being readily dismounted for inspection, cleaning or repair.

An important feature of the invention is that a single valve member serves both as the inlet and the exhaust valve for the controlled chamber.

Figure 1:
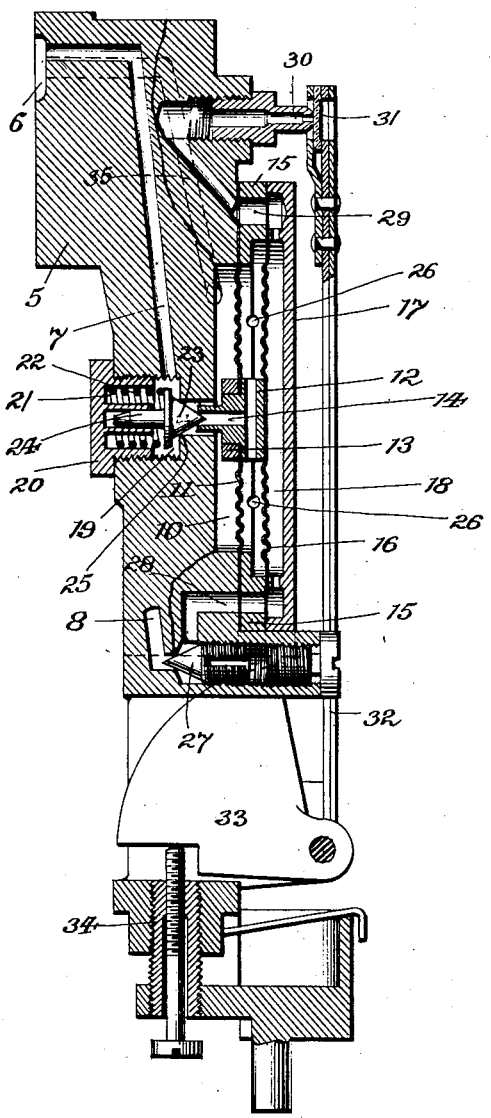
Fig. 1 is a section of the device on the line 1—1 of Fig. 2.
Figure 2:
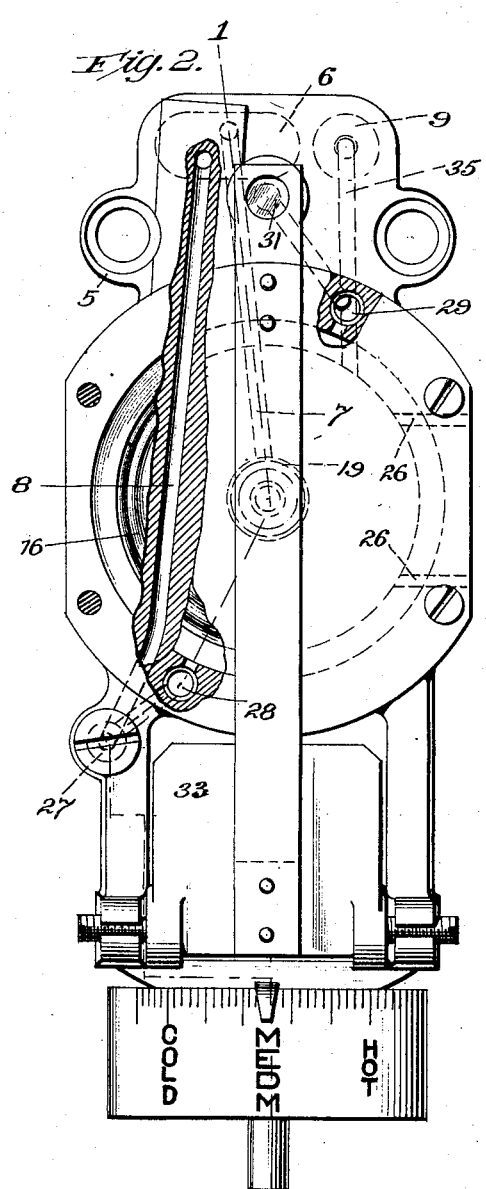
Fig. 2 is a front elevation of the device with certain parts broken away to show the ports.

The body of the device is illustrated at 5 and is intended to be mounted on the usual pipe head, not shown, by which the usual connections to the supply and control piping are made. Pressure fluid is supplied from the pipe head to the recess 6 and from this recess flows through the ports 7 and 8. A second recess 9 is connected by the pipe head and its connected piping with the damper motor or valve to be controlled.

Formed in the front face of the body 5 is a recess or chamber 10 whose forward side is covered by a diaphragm 11 shown as composed of metal, with annular corrugations. The diaphragm 11 is apertured at its center to receive a fitting 12 which is held by a nut 13 threaded thereon, and which is provided with an axial aperture 14, which branches and opens into the space forward of the diaphragm 11.

This diaphragm is held in place by a metal clamping ring 15 which, in turn, supports a second metal diaphragm 16. The diaphragm 16 is essentially the same as the diaphragm 11, except that it is larger, the ring 15 being shouldered, as shown, to increase the effective area of the diaphragm 16 relatively to the diaphragm 11.

The diaphragm 16 is clamped in place by a cover plate 17, having an annular flange on its inner side to afford a chamber 18. The diaphragm 16 is in thrust relation with, but is not connected to, the member 12, carried by the diaphragm 11.

The port 7 leads to a chamber 19 into which is threaded, from the back of the body 5, a plug 20. This plug 20 is formed with an annular spring seat 21, for a spring 22, and the spring 22 tends to close a conical valve 23 which is guided in the plug 20 by means of a stem 24. The valve 23 seats at 25 in a passage leading from the chamber 19 to the chamber 10. It is axially aligned with the member 12 carried by the diaphragm 11 and when the diaphragm 11 is forced to the left, the valve 23 first closes the axial port 14 in the member 12, and is then forced from its seat 25.

The space between the diaphragms 11 and 16 is vented to atmosphere by means of the ports 26 so that when diaphragm 11 moves inward (i. e. to the left relatively to Fig. 1) it first closes an exhaust through the port 14 and then unseats the valve 23 to admit pressure fluid entering through the port 7. The reverse movement first seats the valve 23 to cut off the supply and then opens the exhaust through the port 14.

The second pressure supply port 8 leads to an adjustable needle valve 27 of conventional form. From the needle valve 27 a restricted flow is by way of a port 28 to the chamber 18 in front of the forward diaphragm 16. The port 28 is formed in the body 5, ring 15, and cover 17. From the chamber 18 a port 29 leads to a leak port 30 whose capacity is greater than the adjusted capacity past the needle valve 27. The leak port 30 is controlled by a celluloid valve member 31, which is moved toward and from the leak port by a responsive element illustrated as a bi-metallic bar 32. This is adjustably supported by means of the usual pivoted, weighted saddle 33, and adjusting screw structure 34.

The recess 9 is connected by a port 35 with the chamber 10, which is the controlled chamber.

The differential area of the diaphragms 11 and 16 is so chosen with regard to the strength of the spring 22 and the working pressure that the stress of the spring is approximately neutralized by the excess area of the diaphragm 16. Assuming that pressure fluid is continuously supplied to the recess 6 and that the recess 9 is connected to the motor to be controlled, the operation of the device will readily be understood. The response of the thermostatic bar 32, in the case of a thermostat, so adjusts the valve member 31 relatively to the leak port 30 as to establish a pressure in the controlling chamber 18. The intensity of this pressure is dependent upon the condition of the thermostatic bar 32 and hence is a function of the atmospheric temperature. On an increase of pressure in the chamber 18, the diaphragm 16 will be forced to the left and will tend to move member 12 and diaphragm 11 to the left a similar amount.

Such movement closes the exhaust port 14, if it be open, and opens the inlet valve 23 until a countervailing pressure is created in the controlled chamber 10 and in the connected motor. Similarly, a reduction of pressure in the chamber 18 allows the diaphragm 11 to move to the right until a corresponding reduction of pressure in the chamber 10 has been caused by discharge through the port 14. Consequently, the pressure in the chamber 10 follows the pressure in the chamber 18 and because of the difference in area of the diaphragm the pressure in the chamber 10 is approximately the same as that in the chamber 18. This makes the entire supply pressure available and increases the range of utility of the device.

The valve 23 and its spring can readily be removed by unscrewing the plug 20. The diaphragms may be readily removed by releasing and removing the cover plate 17 and the spacing ring 15.

Since the diaphragms are not connected together, the diaphragm structure is of the utmost simplicity and access to all parts may readily be had.

What is claimed is:

1. A control device comprising in combination a body having a chamber, a pressure fluid inlet port leading thereto, and a port for connecting said chamber with a device to be controlled; a movable wall closing one side of said chamber and formed with an exhaust port leading through said wall to atmosphere; a valve controlling said supply port, spring urged in its closing direction, and arranged to be engaged by said movable wall, and when so engaged to close said exhaust port and upon further inward movement of said wall to open said supply port; a second chamber having a movable wall larger than and in opposed thrust relation with the movable wall of the first chamber; and a valve mechanism responsive to changes in the medium to be controlled and serving to vary the pressure in said second chamber.

2. In an automatic controlling device, the combination of two parallel diaphragms of different areas in thrust relation with each other; a casing forming a controlling chamber in which pressure fluid acts against the larger diaphragm, and a controlled chamber adapted for connection with a controlled device and in which pressure fluid acts in the opposite direction against the smaller diaphragm, the space intervening between the diaphragms being open to the atmosphere and the smaller diaphragm having an exhaust port formed through it near its center; a valve arranged to control the supply of pressure fluid to the controlled chamber, spring urged in its closing direction and arranged to be engaged by the smaller diaphragm and when so engaged to close said exhaust port and upon further inward movement of said diaphragm to open said supply port; and means responsive to the condition of the medium to be controlled for varying the pressure in said controlling chamber.

3. In an automatic controlling device, the combination of two parallel diaphragms of different areas in thrust relation with each other; a casing including a recessed body, a separator ring of different internal diameters on its opposite faces and a recessed cover, the smaller diaphragm being held against the recess in the body by the separator ring and the larger diaphragm being held between the separator ring and the cover, the space between the diaphragms being vented to atmosphere and the smaller diaphragm having a central vent port leading therethrough; a supply port formed in the body and aligned with said central vent port; a combined valve guide and spring seat threaded into said body and coaxial with said supply and vent ports; a spring seated in said seat; a valve urged in closing direction by said spring, guided in said guide and arranged to close said supply and vent ports, individually and simultaneously in different positions of the smaller diaphragm; and valve means responsive to the condition of a medium to be controlled, arranged to vary the pressure in the recess of said cover, and acting on said larger diaphragm.

In testimony whereof we have signed our names to this specification.

ARTHUR J. OTTO.
CARL A. OTTO.